United States Patent
Oelofse (10) Patent No.: US 10,033,314 B2
(45) Date of Patent: Jul. 24, 2018

(54) MODIFIED HALBACH ARRAY GENERATOR

(71) Applicant: ReVair Inc., McClellan, CA (US)

(72) Inventor: Rudolph Oelofse, Seattle, WA (US)

(73) Assignee: MAGNELAN TECHNOLOGIES INC., Salt Lake City, UT (US)

( * ) Notice: Subject to any disclaimer, the term of this patent is extended or adjusted under 35 U.S.C. 154(b) by 92 days.

(21) Appl. No.: 14/290,741

(22) Filed: May 29, 2014

(65) Prior Publication Data

US 2014/0354243 A1  Dec. 4, 2014

Related U.S. Application Data

(60) Provisional application No. 61/828,410, filed on May 29, 2013.

(51) Int. Cl.
| | |
|---|---|
| *H02K 21/24* | (2006.01) |
| *H02P 9/00* | (2006.01) |
| *H02K 1/06* | (2006.01) |
| *H02K 9/02* | (2006.01) |
| *H02K 1/27* | (2006.01) |
| *H02K 1/32* | (2006.01) |
| *H02P 9/02* | (2006.01) |
| *H01F 7/02* | (2006.01) |

(52) U.S. Cl.
CPC ............ *H02P 9/00* (2013.01); *H01F 7/0221* (2013.01); *H01F 7/0273* (2013.01); *H02K 1/06* (2013.01); *H02K 1/2793* (2013.01); *H02K 1/32* (2013.01); *H02K 9/02* (2013.01); *H02K 21/24* (2013.01); *H02P 9/02* (2013.01); *H02K 2213/03* (2013.01)

(58) Field of Classification Search
CPC ............ H02K 1/06; H02K 9/02; H02K 21/24; H02K 1/2793; H02K 1/32; H02K 2213/03; H02P 9/00; H02P 9/02; H02F 7/022; H02F 7/0273
See application file for complete search history.

(56) References Cited

U.S. PATENT DOCUMENTS

| | | | | |
|---|---|---|---|---|
| 5,117,141 A | * | 5/1992 | Hawsey | .............. B63H 5/10 |
| | | | | 310/114 |
| 6,841,910 B2 | | 1/2005 | Gery | |
| 7,105,979 B1 | | 9/2006 | Gabrys | |
| | | (Continued) | | |

FOREIGN PATENT DOCUMENTS

| | | | | | |
|---|---|---|---|---|---|
| JP | | 2013062989 A | * | 4/2013 | |
| WO | WO 2011139396 A1 | * | 11/2011 | ............... H02K 3/47 |

OTHER PUBLICATIONS jp2013062989A machine translation Feb. 9, 2016.*
ReVair wind Turbines, http://www.revairwind.com/gallery/; Jul. 23, 2013; retrieved from wayback machine on Sep. 27, 2014; https://web.archive.org/web/20130723164027/http:/www.revairwind.com/gallery/.

(Continued)

*Primary Examiner* — Joshua Benitez Rosario
*Assistant Examiner* — Leda Pham
(74) *Attorney, Agent, or Firm* — Fish IP Law, LLP (57) ABSTRACT

A generator is provided having a first array of magnets and a second array of magnets. The first array is typically disposed in a first elongated Halbach configuration and the second array of magnets is disposed in a second configuration. The first and second arrays are configured to manipulate a net flux field to form a figure eight flux field between the first and second arrays. At least one coil disposed between the first and second arrays, such that relative movement of the first and second arrays with respect to the first coil generates an electric current.

17 Claims, 9 Drawing Sheets

(56) References Cited

U.S. PATENT DOCUMENTS

| | | | |
|---|---|---|---|
| 7,444,919 B1* | 11/2008 | Mansfield | F41B 6/003 89/8 |
| 8,193,657 B2 | 6/2012 | Paluszek | |
| 8,397,369 B2 | 3/2013 | Smith | |
| 8,400,038 B2* | 3/2013 | Smith | H02K 1/2766 310/156.07 |
| 2003/0025417 A1* | 2/2003 | Rose | H02K 21/12 310/180 |
| 2008/0238266 A1* | 10/2008 | Moriyama | H02K 1/2793 310/67 R |
| 2009/0267436 A1* | 10/2009 | Stiesdal | B29C 70/70 310/156.23 |
| 2010/0013340 A1 | 1/2010 | Brown | |
| 2010/0176674 A1* | 7/2010 | Post | H02K 49/102 310/103 |
| 2010/0181858 A1* | 7/2010 | Hibbs | H02K 1/27 310/156.07 |
| 2012/0019235 A1* | 1/2012 | Post | B60L 13/06 324/207.13 |
| 2012/0229060 A1* | 9/2012 | Ritchey | H02P 25/18 318/400.3 |
| 2013/0113317 A1 | 5/2013 | Englert | |
| 2014/0103765 A1* | 4/2014 | Post | H02K 49/102 310/103 |

OTHER PUBLICATIONS

True North Bridged Composites, Inc.; Power Solution, Wind Power, Brochure; Sep. 26, 2017; pp. 1-13; McClellan, CA.

True North Bridged Composites, Inc.; Purchase and Sale Agreement—TNBC and Chaminade High School; Vertical Axis Wind Turbine#: Modified Model: T-os, MGN. This Purchase; Mar. 28, 2012; pp. 1-5; Sacramento, CA.

* cited by examiner

MODIFIED HALBACH ARRAY GENERATOR

This application claims priority to U.S. Provisional Application Ser. No. 61/828,410, filed May 29, 2013. That application, and all other extrinsic materials identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is generators and, more particularly, magnetic generators.

BACKGROUND

The background description includes information that may be useful in understanding the present invention. It is not an admission that any of the information provided herein is prior art or relevant to the presently claimed invention, or that any publication specifically or implicitly referenced is prior art.

Halbach array systems and other permanent magnet configurations have been used for many applications, such as coupling systems (e.g., U.S. Pat. No. 6,841,910 to Gery and U.S. Pat. Pub. 2013/0113317 to Englert) and electromagnetic machines that convert mechanical energy to electrical energy. Typical electromagnetic machines have a rotor and a stator. The rotor contains magnets and the stator contains windings to carry the electric current through the coils. While the basic configuration of electromagnetic machines is known, such machines appear to be fairly limited in efficiency.

One example of an electromagnetic machine is U.S. Pat. No. 7,105,979 to Gabrys, which discloses a heteropolar hybrid machine for converting between electrical and mechanical energy. The machine has a rotor that comprises ferromagnetic and permanent magnet poles around its circumference and a stator having a field coil and an armature located in an armature air gap of the rotor. The field coil generates a field coil flux and the permanent magnet poles generate a permanent magnetic flux that both flow through the armature air gap through the ferromagnetic rotor structure to induce AC voltage in multiphase windings of the armature. However, a larger air gap is required between the rotor and stator to place the windings, which may increase the demand of magnetomotive force.

Other examples of known electromagnetic machines can be found in U.S. Pat. No. 8,193,657 to Paluszek and U.S. Pat No. 8,397,369 to Smith. Unfortunately, known efforts apparently failed to appreciate optimized magnetic flux configurations.

Thus, there is still a need for improved magnetic generators.

SUMMARY OF THE INVENTION

The inventive subject matter provides apparatus, systems and methods in which a generator has a first array of magnets and a second array of magnets. The first array of magnets is disposed in a first elongated Halbach configuration, and the second array of magnets is disposed in a second elongated Halbach configuration. The magnetic orientation of the first and second arrays of magnets influences the flux field of each array of magnets, such that a figure eight flux field is created between the first and second arrays. The generator further includes a first coil that is disposed between the first and second arrays, such that relative movement of the first and second arrays with respect to the first coil generates an electrical current.

Various objects, features, aspects and advantages of the inventive subject matter will become more apparent from the following detailed description of preferred embodiments, along with the accompanying drawing figures in which like numerals represent like components.

DETAILED DESCRIPTION

The following description includes information that may be useful in understanding the present invention. It is not an admission that any of the information provided herein is prior art or relevant to the presently claimed invention, or that any publication specifically or implicitly referenced is prior art.

Figure 1:
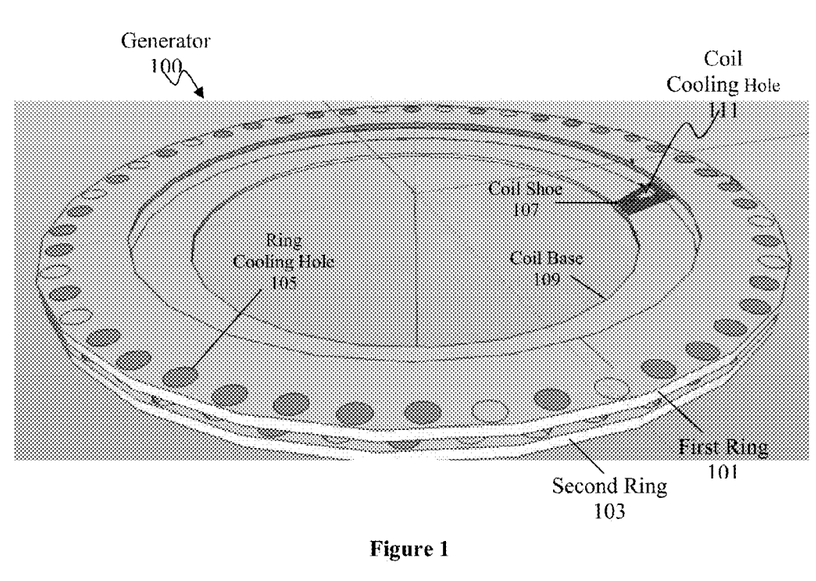
FIG. 1 is a perspective view of a generator of the inventive subject matter.

FIG. 1 shows an example of a generator 100 having a first ring 101, a second ring 103, and a coil (not shown) within a coil shoe 107. First ring 101 has a first array of magnets, and second ring 103 has a second array of magnets. Each of the first and second arrays of magnets is disposed within the rings such that the arrays of magnets are fully encapsulated by the material of the ring (e.g., composite fully encapsulating array of magnets). However, in other contemplated embodiments, at least one of the first and second arrays of magnets can be partially encapsulated. Regardless of the mounting of the arrays, it is generally preferred that the first and second arrays of magnets are disposed along the inner circumference of first ring 101 and second ring 103.

Coil shoe 107 is mounted on a coil base 109 in a position between the first ring 101 and the second ring 103, and in a position that aligns the coil (inside coil shoe 107) between the first and second arrays of magnets. The magnetic orientation of generator 100 allows a flux of the first array of magnets and a flux of the second array of magnets to interact and manipulate the net flux field to form a figure eight flux field between the first and the second array of magnets (see FIG. 5). Coil shoe 107 is mounted on coil base 109, and typically remains stationary (i.e., does not rotate) while first ring 101 and second ring 103 rotate. In that manner, relative movement of the first and second arrays of magnets with respect to the coil generates an electric current.

First ring 101 and second ring 103 can be made of any suitable materials. For example, at least one of first ring 101 and second ring 103 can be a metal or metal alloy, or a composite (e.g., fiber resin infused composite). Additionally, first ring 101 and second ring 103 can have any suitable sizes. In one embodiment, at least one of first ring 101 and second ring 103 has a diameter of at least 0.125 meters. While FIG. 1 shows first ring 101 and second ring 103 having a similar size, it is contemplated that first and second rings could differ in size so long as the first and second arrays of magnets of each ring can interact.

First ring 101 preferably has ring cooling holes 105 along its outer circumference to provide passive cooling by allowing airflow through generator 100. As shown in FIG. 1, first ring 101 can have a plurality of ring cooling holes 105 to provide cooling. The plurality of ring cooling holes 105 can provide a viewing area for inspecting the placement of coil shoe 107. Additionally, second ring 103 can also have ring cooling holes 105 to provide further cooling throughout generator 100.

Coil shoe 107 can be made of a composite (e.g., a fiber resin infused composite) and can also have a coil cooling hole 111. As mentioned above, coil shoe 107 is located between first ring 101 and second ring 103.

Figure 2A:
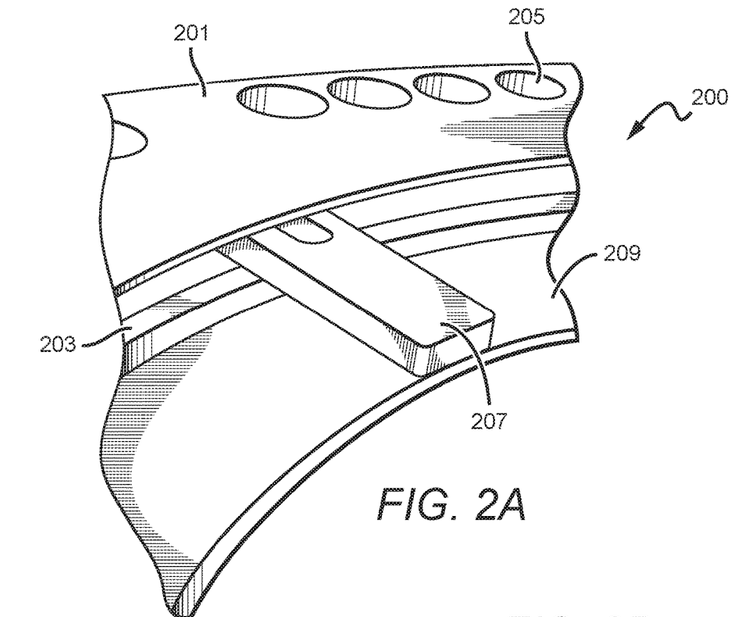
FIGS. 2A and 2B are perspective views the coil and ring arrangement of the generator of FIG. 1.
Figure 2B:
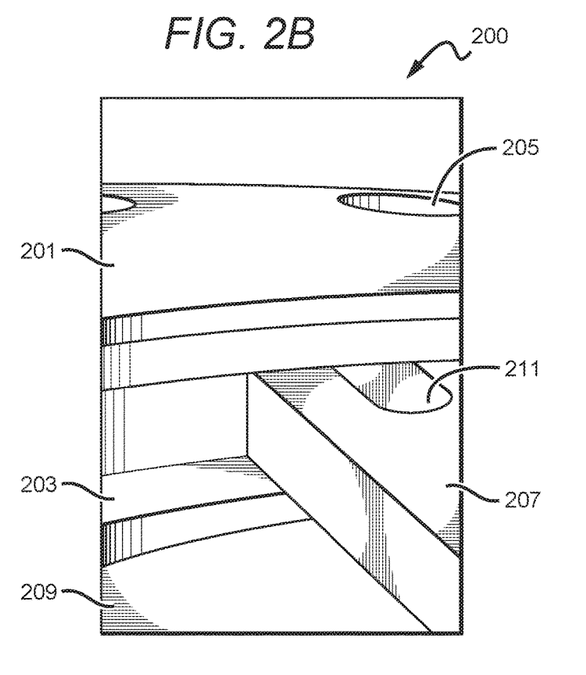

FIGS. 2A and 2B provide an example of a coil shoe 207 and first 201 and second ring 203 arrangements. Coil shoe 207 is positioned on coil base 209 between first ring 201 having ring cooling hole 205 and second ring 203. As shown, a portion of coil shoe 207 can be placed in the gap between first ring 201 and second ring 203. Most preferably, the portion of coil shoe 207 placed in the space between first ring 201 and second ring 203 comprises the coil. Moreover, in other contemplated embodiments, the portion of coil shoe 207 placed in the space between first ring 201 and second ring 203 could also comprise coil cooling hole 211.

Figure 3:
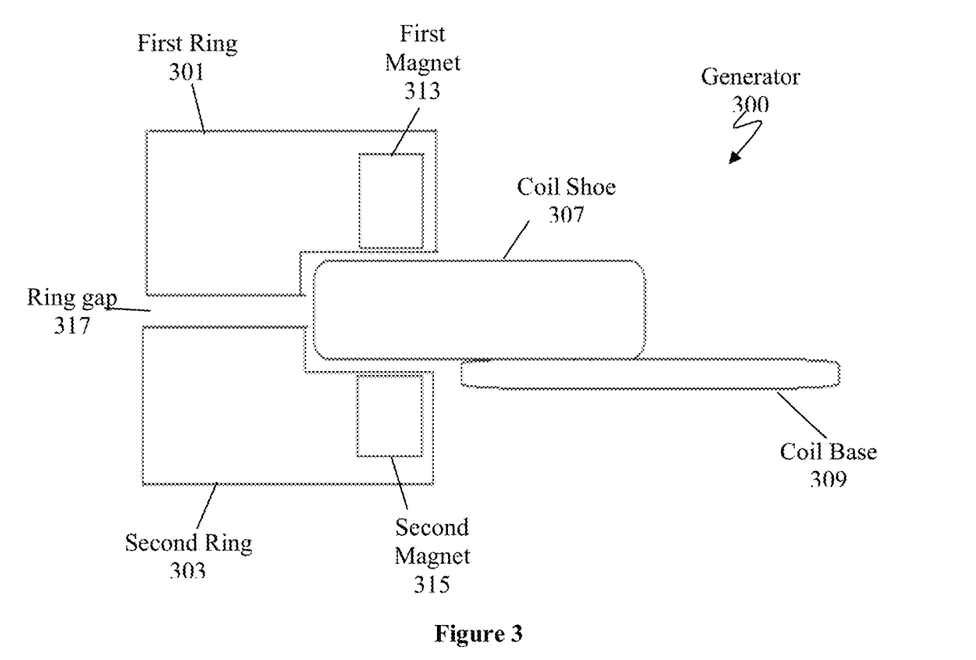
FIG. 3 is a cross-sectional view of a portion of the generator of FIG. 1.

FIG. 3 shows a cross sectional view of generator 300 having first ring 301 and second ring 303. First ring 301 and second ring 303 are spaced apart by a ring gap 317. In contemplated embodiments, ring gap 317 can be increased or decreased by use of a mechanism (e.g., hydraulic pump, electrical motor, magnets). Increasing or decreasing air gap 317 can provide several benefits. For example, one benefit is that increasing ring gap 317 allows generator 300 to accommodate larger coils. Another benefit is that decreasing ring gap 317 increases flux density to produce more power.

First ring 301 can have a first magnet 313 of the first array of magnets. First magnet 313 can comprise a rare earth material. Second ring 303 can have a second magnet 315 of the second array of magnets. Second magnet 315 can also comprise a rare earth material. As shown in FIG. 3, first magnet 313 and second magnet 315 can be aligned along the same vertical axis, such that first magnet 313 is located directly above second magnet 315. However, it is contemplated that first magnet 313 and second magnet 315 can be aligned in different orientations. For example, first magnet 313 can be positioned at an angle with respect to second magnet 315.

As shown in FIG. 3, first magnet 313 of the first array of magnets is separated from second magnet 315 from the second array of magnets is separated by ring gap 317. Ring gap 317 comprises a portion of coil shoe 307 (the portion encapsulating the coil) and an air gap. In contemplated embodiments, the first and second array of magnets are separated by ring gap 317 comprising a coil and an air gap of at least 3% of a thickness of the coil, but preferably not more than 30%.

First magnet 313 and second magnet 315 can be encapsulated within first ring 301 and second ring 303, respectively. Moreover, first magnet 313 and second magnet 315 can be disposed along the inner circumference of first ring 301 and second ring 303, such that coil (encapsulated within coil shoe 307) remains stationary along the inner circumference of generator 300 (see orientation of coil and rings in FIG. 1) while first ring 301 and second ring 303 rotate.

Figure 4A:
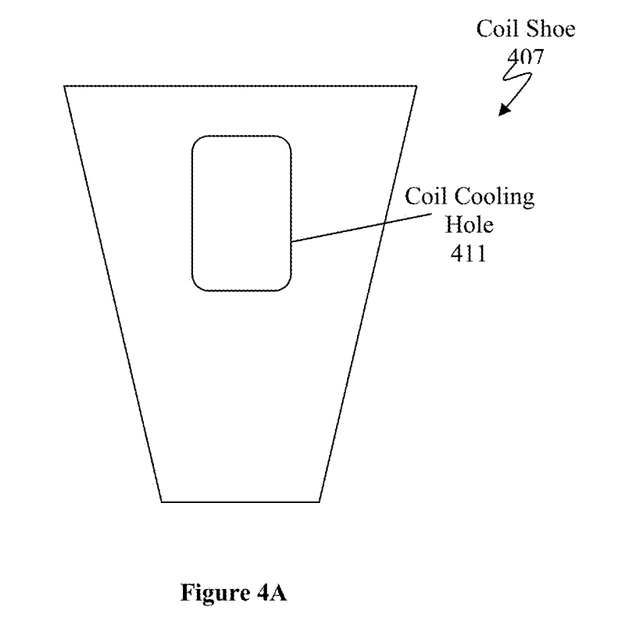
FIG. 4A is top view of one of the coils of the generator of FIG. 1.
Figure 4B:
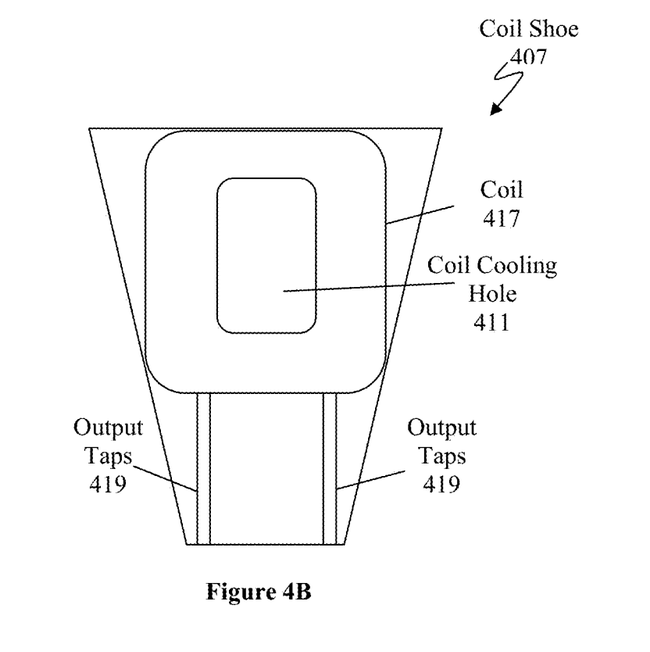
FIG. 4B is a cross-sectional view of the coil of FIG. 4A.

FIGS. 4A and 4B show an example of a coil shoe 407 having a coil cooling hole 411. FIG. 4B shows a cross-sectional view of coil shoe 407 in FIG. 4A. Coil shoe 407 has a coil 417 and a pair of output taps 419. Coil 417 is preferably located near coil cooling hole 411. In contemplated embodiments, coil 417 is a copper coil.

Output taps 419 can be used to harness the power produced by the generator. In other contemplated embodiments, at least one of output taps 419 can be used to connect coil 417 to more coils in singular or multiple groups. Moreover, coil 417 can connect to other coils in series or parallel configuration to control amperage and voltage output. In a typical generator system having a number of installed magnets and a number of installed coils, the ratio between the number of installed magnets and the number of installed coils is at least 5:1 or more preferably at least 10:1.

Figure 5:
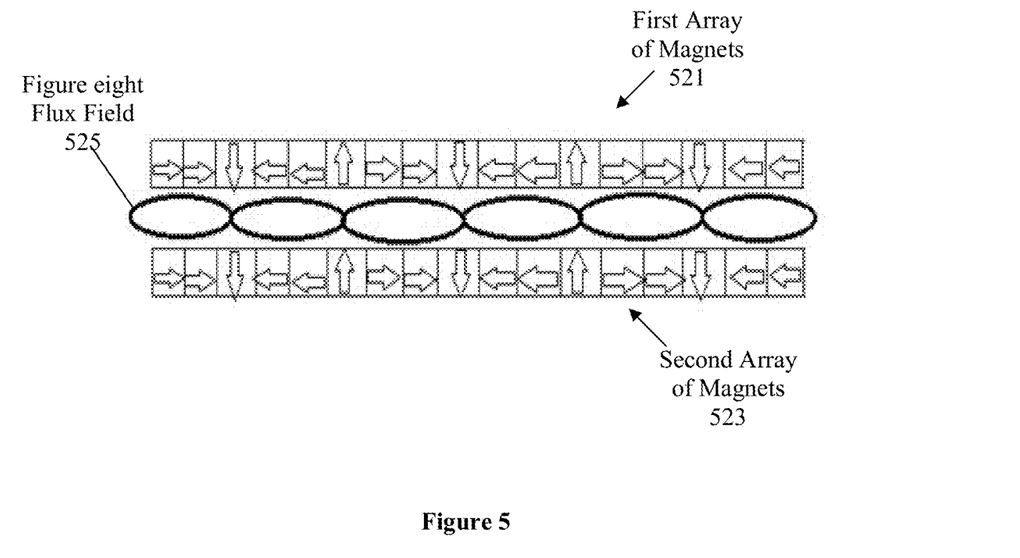
FIG. 5 is a perspective view of first and second arrays of magnets producing a figure eight flux field in the generator of FIG. 1.

FIG. 5 shows a side perspective view of an example of a first array of magnets 521 and a second array of magnets 523 producing a figure eight flux field 525. As shown, first array of magnets 521 and second array of magnets 523 are disposed in a first elongated Halbach configuration. Unlike traditional Halbach array configurations (having a rotating pattern of left, up, right, down), first array of magnets 521 and second array of magnets 523 have an elongated pattern (right, right, down, left, left, up). The magnetic orientation of first array of magnets 521 creates a flux field that is interacting and complementing the flux field of second array of magnets 523. Thus, a net flux field is manipulated to form a figure eight flux field 525 between the first 521 and second arrays 523.

As described above, a coil is placed between the first 521 and second arrays 523, such that the relative movement of the first 521 and second arrays 523 with respect to the coil generates an electric current. While FIG. 5 shows a first 521 and second array 523 having magnets with no gaps, it is contemplated that an array can be configured to have at least on gap between the plurality of magnets.

Figure 6:
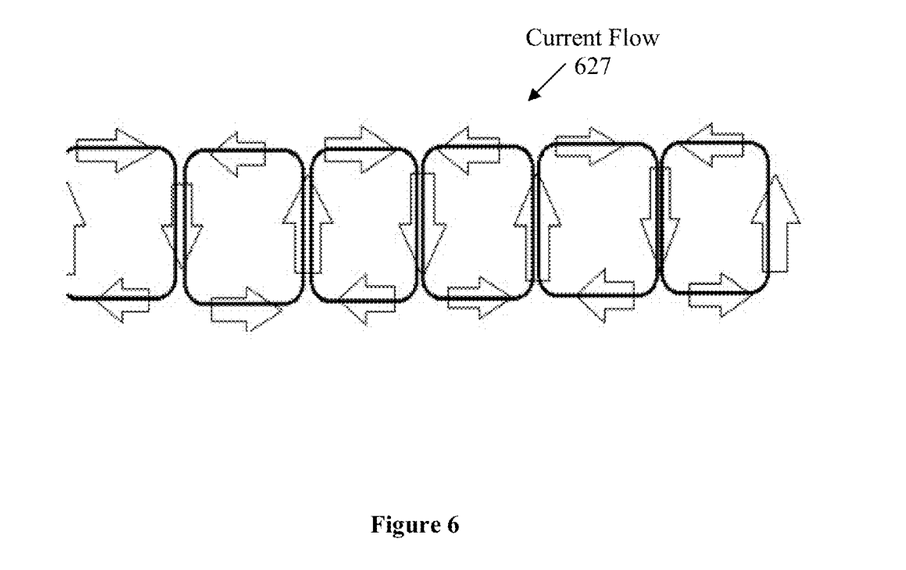
FIG. 6 is a top view of a current flow path produced by the flux field of FIG. 5.

FIG. 6 shows an example of a current flow path 627 produced by the flux field in FIG. 5. Current flow path 627 is perpendicular to the flux field of FIG. 5. Having knowledge of the current flow path 627 produced by the flux field in FIG. 5, it should be appreciated that a coil can be arranged between a first and second array of magnets so that the current generated is flowing in the same direction of the coil at all times.

Figure 7:
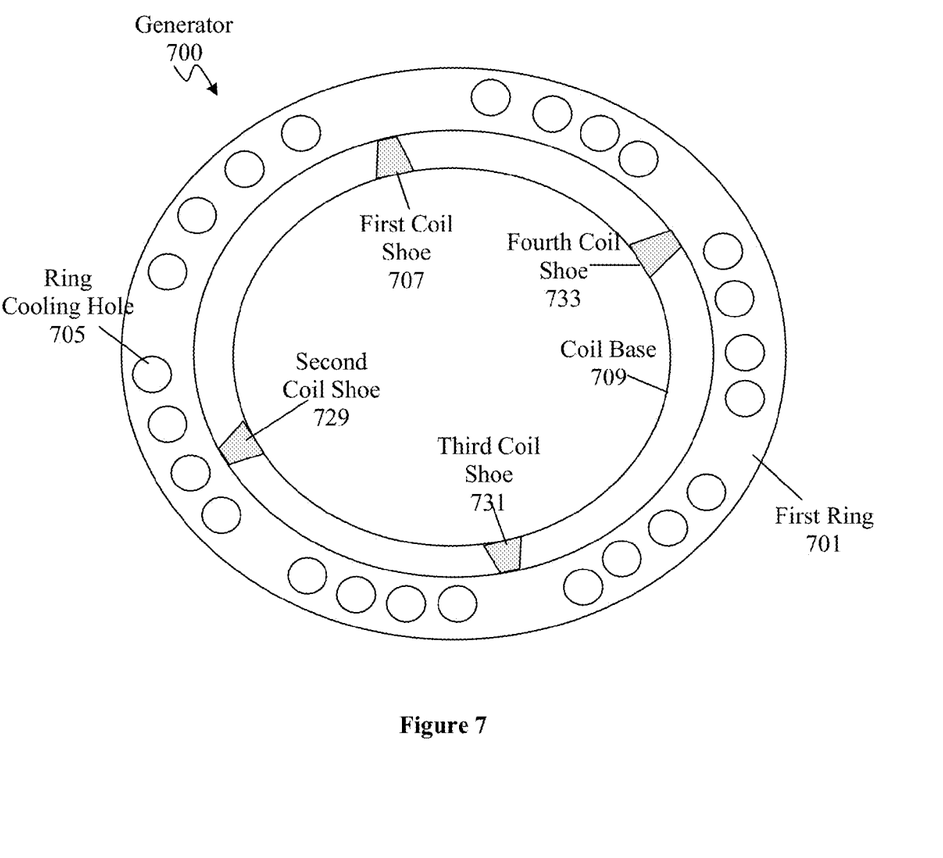
FIG. 7 is a top view of the generator of FIG. 1, depicting first, second, third and fourth coils.

FIG. 7 shows generator 700 comprising a first coil shoe 707, a second coil shoe 729, a third coil shoe 731, and a fourth coil shoe 733 mounted on coil base 709, each of which is partially disposed between the first and second arrays of magnets disposed along the inner circumference of the first ring 701 and a second ring (not shown). The first 707, second 729, third 731 and fourth coil shoes 733 have a first coil, second coil, third coil and fourth coil, respectively, that is at least partially embedded within the coil shoe. In preferred embodiments, the first, second, third and fourth coils are disposed between the first and second arrays of magnets.

Figure 8A:
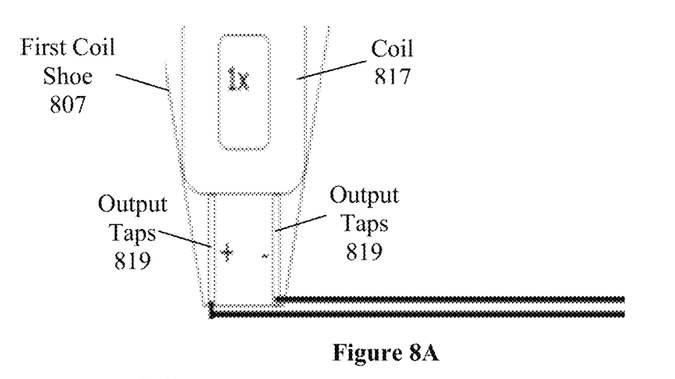
FIGS. 8A-8C are top views of a coil of FIG. 1, depicting series and parallel coil configurations.
Figure 8B:
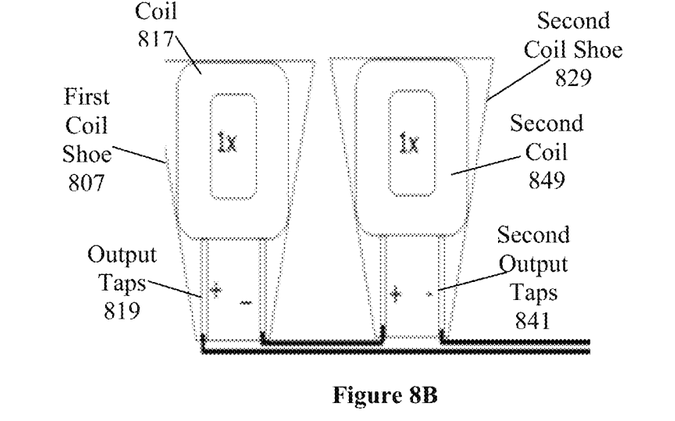
Figure 8C:
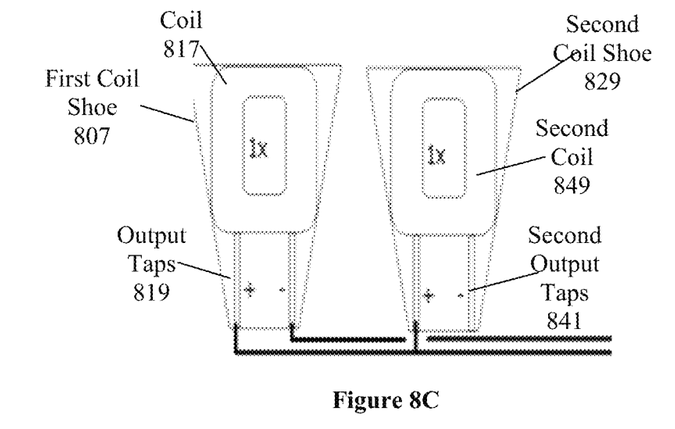

Generator 700 can further comprise a controller that configures the first, second, third and fourth coils in different series and parallel configurations to control amperage and voltage output as shown in FIGS. 8A-8C. FIG. 8A shows coil shoe 807 having coil 817 and output taps 819 for coupling other devices using at least one of a positive and negative side output taps 819. FIG. 8B shows a coil 817 and second coil 849 connected in a series configuration using output taps 819 and 841. The negative side of output tap 819 in coil shoe 807 connects to the positive side of output tap 841 of coil shoe 829 to create a series connection. In an exemplary embodiment, coil 817 has 1× volt and second coil 849 has 1× volt, such that a series configuration can produce 2× volts and 2 amps. FIG. 8C shows coil 817 and second coil 849 connected in a parallel configuration using output taps 819 and 841. The positive sides of output taps 819 in coil shoe 807 and output taps 841 in coil shoe 829 join to create a parallel configuration.

Additionally, the controller can be configured to pre-load at least one of the first, second, third and fourth coils or any multiples thereof, which is allowed by the geometry and space available provided by the circumference of the rings. The controller can be configured to program first and second inverters to engage output from the coils in evenly distributed loading as not to impede the generating device.

Figure 9:
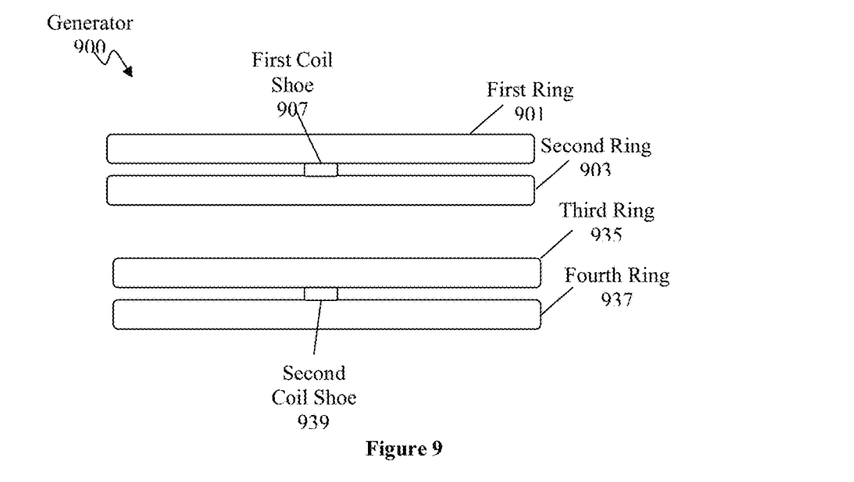
FIG. 9 is a perspective view of the generator of FIG. 1, depicting a multiple ring assembly.

In another aspect, multiple rings can be stacked vertically to increase generator power output and size. For example, FIG. 9 shows generator 900 having a first ring 901 and a second ring 903 having a first array of magnets and a second array of magnets, respectively. First coil in first coil shoe 907 is disposed between first and second array of magnets to produce power as described in the embodiments above.

Generator 900 further includes third ring 935 having a third array of magnets disposed in a third elongated Halbach configuration and a fourth ring 937 having a fourth array of magnets disposed in a fourth configuration (e.g., fourth elongated Halbach configuration). The third and fourth arrays can be configured to manipulate a second net flux field to form a second figure eight flux field between the third and fourth arrays. Second coil shoe 939 is disposed between the third and fourth arrays, such that relative movement of at least one of the third and fourth arrays with respect to the second coil generates additional electric current.

Figure 10A:
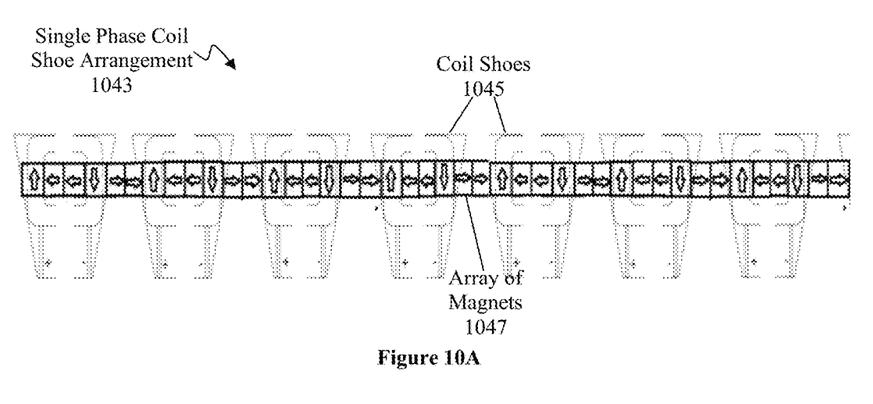
FIGS. 10A-10B are top views of a multiple coils of the generator of FIG. 1, depicting single phase and multiple phase configurations.
Figure 10B:
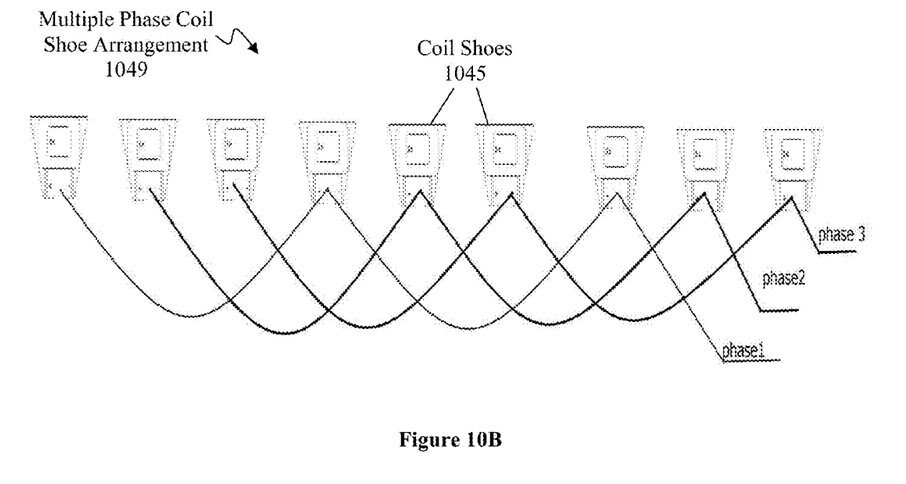

It should be appreciated that the generators disclosed herein can be configured as either a single phase magnetic motor or a multi-phase magnetic motor by adjusting the coil placement to allow for either application as shown in FIGS. 10A-B. FIG. 10A shows single phase coil shoe arrangement 1043 having a plurality of coil shoes 1045 partially disposed below array of magnets 1047. FIG. 10B shows multiple phase coil shoe arrangement 1049 having a plurality of coil shoes 1045 producing three phases. Contemplated embodiments require that the coils are placed 120 degrees out of phase to produce a three phase configuration. For example, a three coil shoe arrangement comprises a distance between first and second coils at 1× and a distance between the second and third coils at 2×.

The generators disclosed herein can be used in various power generation systems. For example, the generators can be used in turbine systems (e.g., vertical axis turbines) and other systems that can generate mechanical energy to rotate the array of magnets.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One should appreciate that the disclosed techniques provide many advantageous technical effects including efficient power generation using a magnified flux field effect having figure eight geometry.

The following discussion provides many example embodiments of the inventive subject matter. Although each embodiment represents a single combination of inventive elements, the inventive subject matter is considered to include all possible combinations of the disclosed elements.

Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A generator, comprising:
   a first ring comprising a first array of magnets disposed in a first elongated Halbach configuration with a pattern of left-left-up-right-right-down;
   a second ring comprising a second array of magnets disposed in a second configuration, wherein the first ring and the second ring are rotatably separate rings;
   wherein the first and second arrays are configured to manipulate a net flux field to form a figure eight flux field between the first and second arrays; and
   a first coil disposed between the first and second arrays such that relative movement of the first and second arrays with respect to the first coil generates an electric current.

2. The generator of claim 1, wherein the second array of magnets is disposed in a second elongated Halbach configuration.

3. The generator of claim 1, wherein the first array of magnets is encapsulated by the first ring.

4. The generator of claim 1, wherein at least one of the first ring and the second ring comprises a fiber resin infused composite.

5. The generator of claim 1, wherein the first ring comprises a plurality of ring cooling holes.

6. The generator of claim 1, wherein at least one of the first ring and the second ring has a diameter of at least 0.125 meters.

7. The generator of claim 1, wherein the first coil is disposed on a coil base that is stationary.

8. The generator of claim 1, wherein the first and second arrays of magnets are separated by a ring gap comprising the first coil and an air gap of at least 3% of a thickness of the first coil.

9. The generator of claim 1, wherein a vertical distance separates the first ring from the second ring.

10. The generator of claim 1, wherein the first coil is disposed within a fiber resin infused composite.

11. The generator of claim 1, wherein the first array of magnets comprises a rare earth material.

12. The generator of claim 1, having a number of installed magnets and a number of installed coils, and wherein a ratio between the number of installed magnets and the number of installed coils is at least 10:1.

13. The generator of claim 1, further comprising second, third and fourth coils, each of which is disposed between the first and second arrays.

14. The generator of claim 13, further comprising a controller that configures the first, second, third and fourth coils in different series and parallel configurations to control amperage and voltage output.

15. The generator of claim 13, further comprising a controller that is configured to pre-load at least one of the first, second, third and fourth coils.

16. The generator of claim 1, further comprising a controller that configures first and second inverters to engage output from the coils in evenly distributed loading as not to impede the generator.

17. The generator of claim 1, further comprising:
   a third array of magnets disposed in a third elongated Halbach configuration;
   a fourth array of magnets disposed in a fourth configuration;
   wherein the third and fourth arrays are configured to manipulate a second net flux field to form a second figure eight flux field between the third and fourth arrays; and
   a second coil disposed between the third and fourth arrays such that relative movement of at least one of the third and fourth arrays with respect to the second coil generates additional electric current.

* * * * *